United States Patent
Suga

(10) Patent No.: US 8,554,227 B2
(45) Date of Patent: Oct. 8, 2013

(54) CELL SELECTION BASED ON PRIORITY FACTORS IN OVERLAPPING CELLS USING DIFFERENT FREQUENCIES

(71) Applicant: Fujitsu Limited, Kawasaki (JP)

(72) Inventor: Junichi Suga, Ota (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/685,187

(22) Filed: Nov. 26, 2012

(65) Prior Publication Data

US 2013/0084872 A1  Apr. 4, 2013

Related U.S. Application Data

(63) Continuation of application No. PCT/JP2010/059002, filed on May 27, 2010.

(51) Int. Cl.
 *H04W 4/00* (2009.01)
 *H04W 36/00* (2009.01)
 *H04W 72/00* (2009.01)
 *H04B 7/00* (2006.01)

(52) U.S. Cl.
 USPC ........ 455/437; 455/422.1; 455/443; 455/450; 455/509; 455/512; 455/525

(58) Field of Classification Search
 USPC .............. 455/418–420, 422.1, 423–425, 434, 455/435.1–435.3, 436–450, 452.1–452.2, 455/453, 500, 507, 509–510, 512–514, 455/550.1, 556.2, 561, 67.11, 524–525, 455/552.1; 370/328–329, 331, 338, 341
 See application file for complete search history.

(56) References Cited

U.S. PATENT DOCUMENTS 6,546,250 B1 * 4/2003 Turcotte et al. ................ 455/437
7,787,893 B2 * 8/2010 Jeong et al. .................... 455/464

(Continued)

FOREIGN PATENT DOCUMENTS

| JP | 05-244075 A | 9/1993 |
| JP | 11-285046 A | 10/1999 |
| JP | 2006-253924 A | 9/2006 |

OTHER PUBLICATIONS

3GPP TS 36.304 V9.1.0, 3rd Generation Partnership Project; Technical Spedfication Group Radio Access Network; Evolved Universal Terrestrial Radio Access (E-UTRA); User Equipment (UE) procedures in idle mode (Release 9): http://www.3gpp.org; 2009, 3GPP Organizational Partners.

*Primary Examiner* — Meless Zewdu
(74) *Attorney, Agent, or Firm* — Arent Fox LLP

(57) ABSTRACT

A wireless communication system includes: at least one base station that forms a plurality of cells of different frequencies such that the cells partially or completely overlap with each other; and a terminal that is capable of recognizing the cells of the different frequencies. The base station determines priority factors of the different frequencies of the cells, and transmits the priority factors to the terminal that has set a cell formed by the base station as a serving cell. The terminal receives the priority factors from the base station forming the serving cell, and selects a cell to be set as the serving cell next from among the cells based on the priority factors.

9 Claims, 13 Drawing Sheets

(56) References Cited

U.S. PATENT DOCUMENTS

| | | | |
|---|---|---|---|
| 8,300,593 B2* | 10/2012 | Nielsen et al. | 370/331 |
| 8,442,002 B2* | 5/2013 | Zhou et al. | 370/330 |
| 2005/0041608 A1* | 2/2005 | Jeong et al. | 370/310 |
| 2009/0181676 A1* | 7/2009 | Lee et al. | 455/436 |
| 2009/0303952 A1* | 12/2009 | Hosokawa | 370/329 |
| 2011/0053597 A1* | 3/2011 | Lee et al. | 455/436 |

* cited by examiner

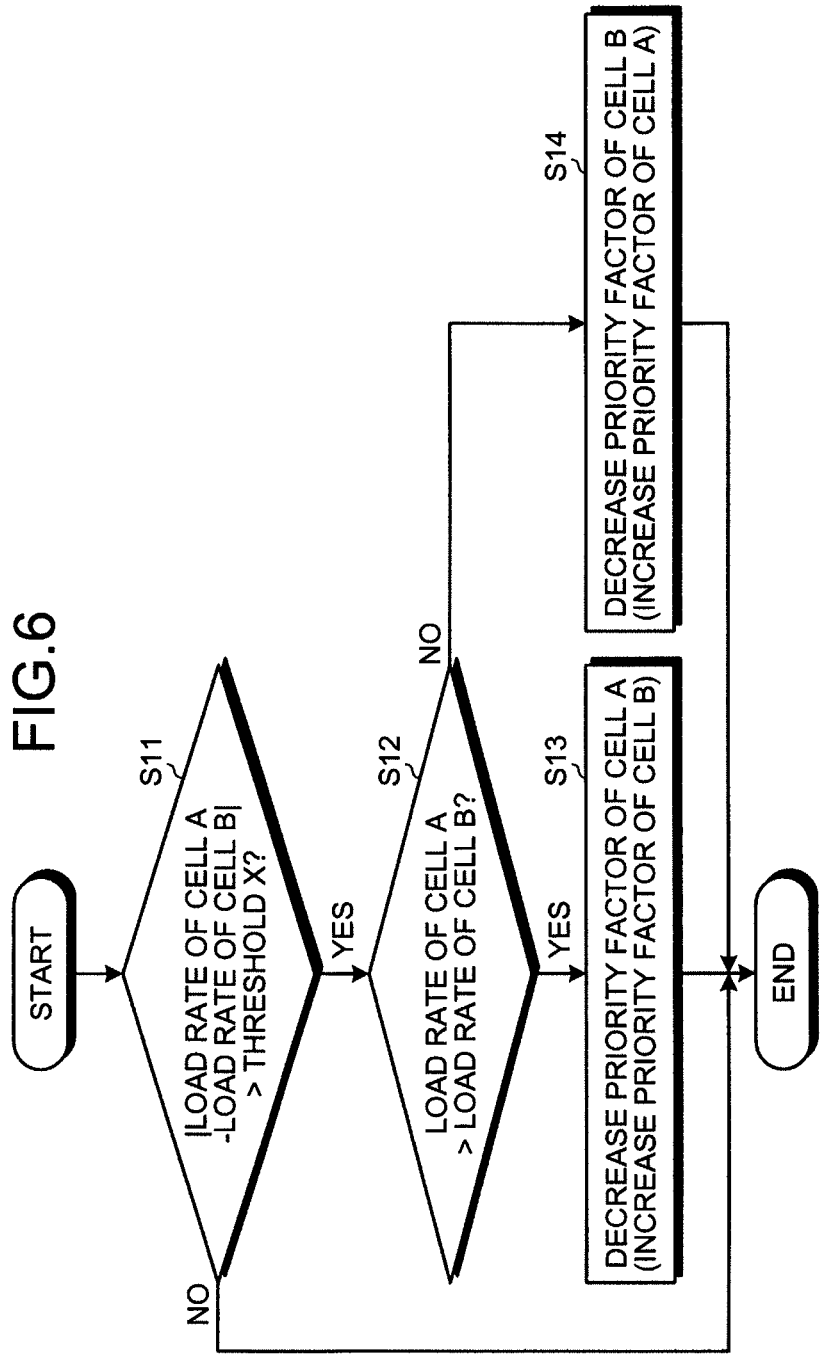

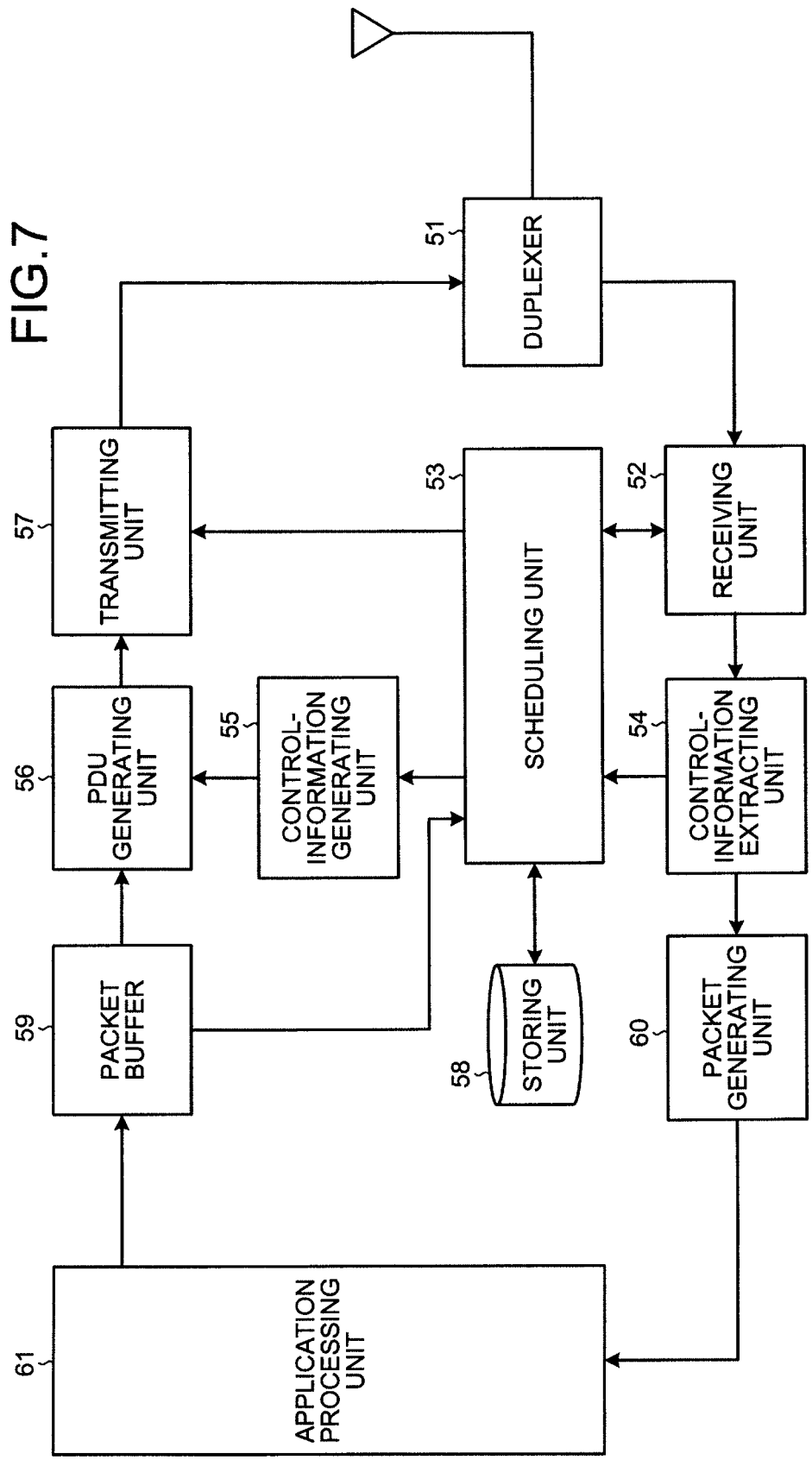

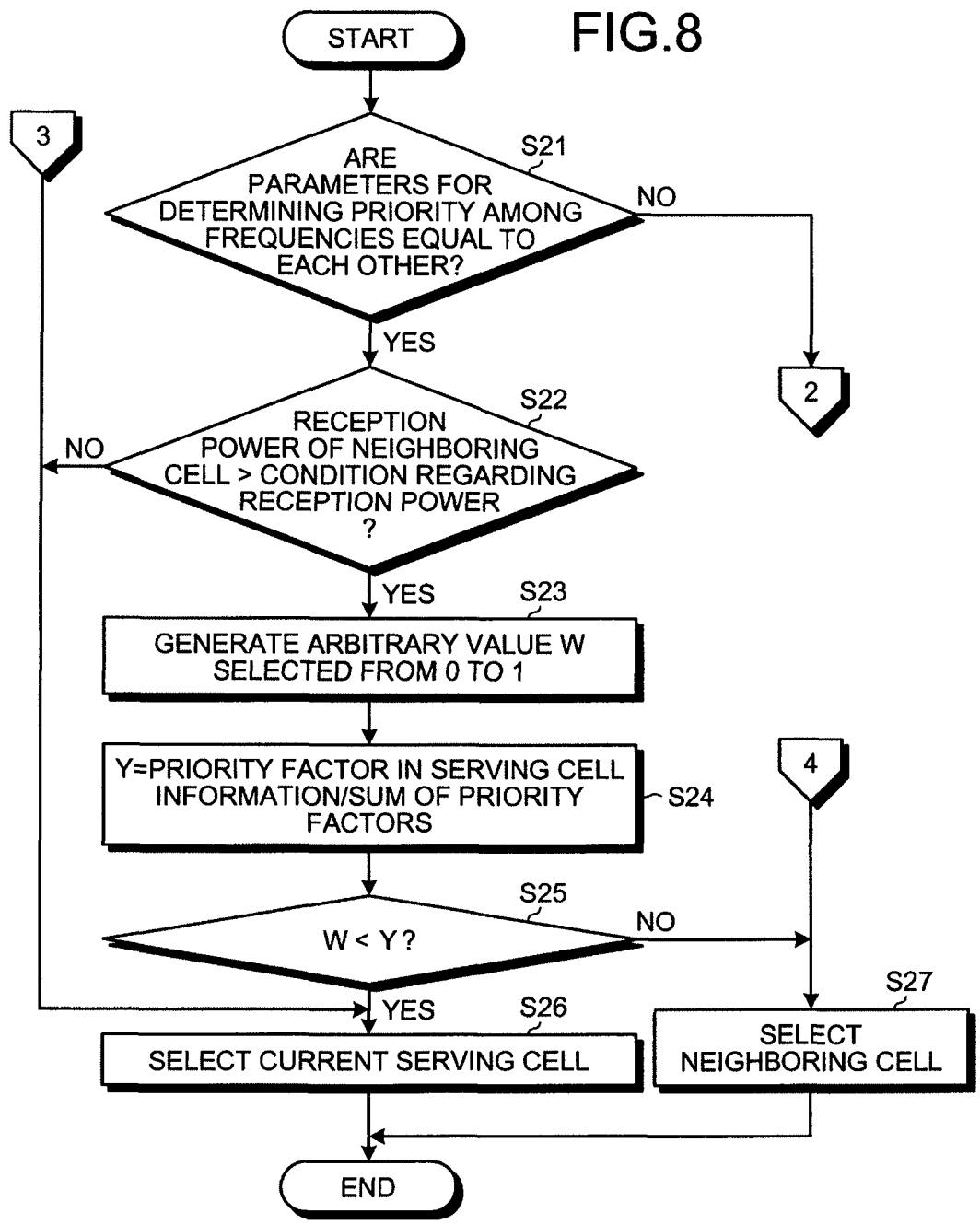

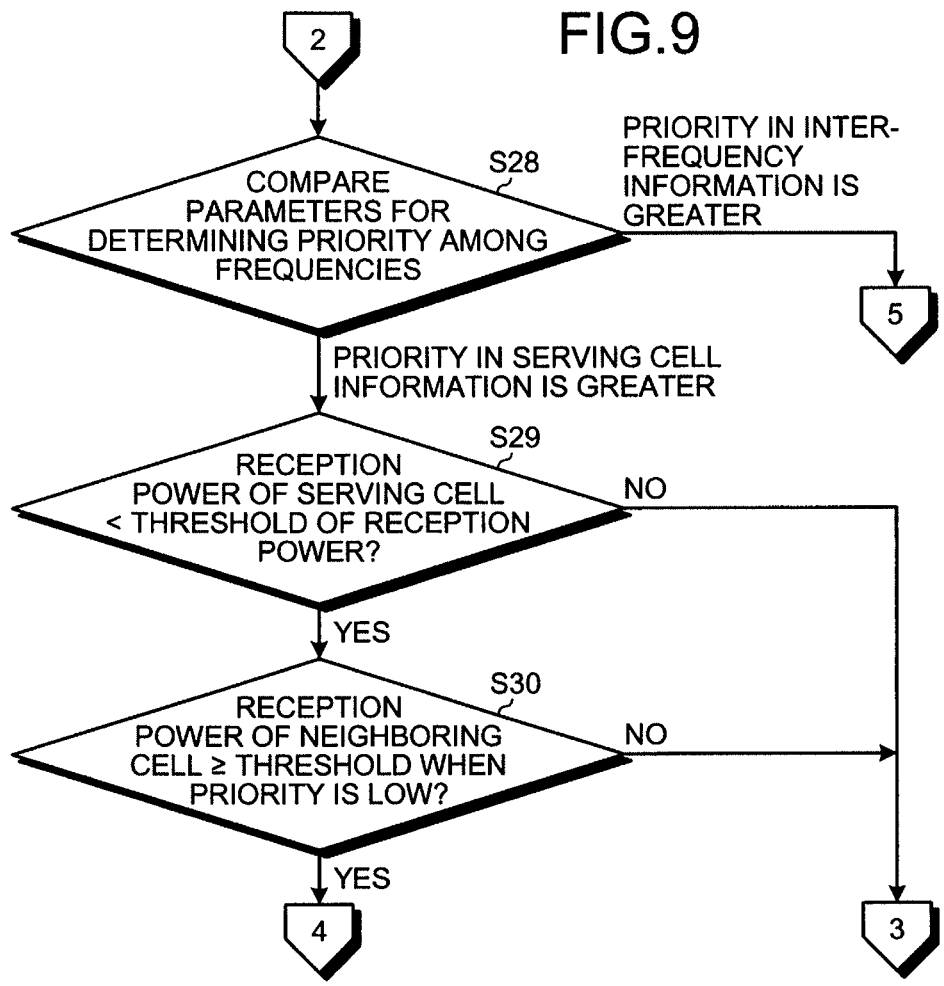
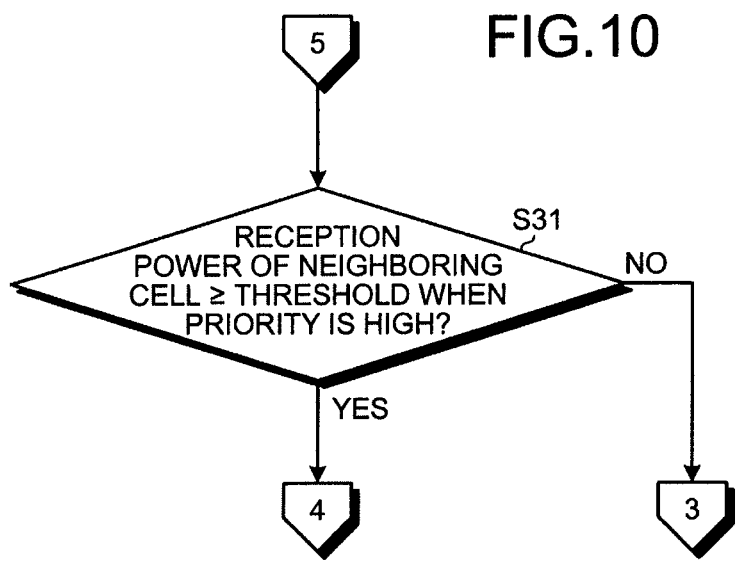

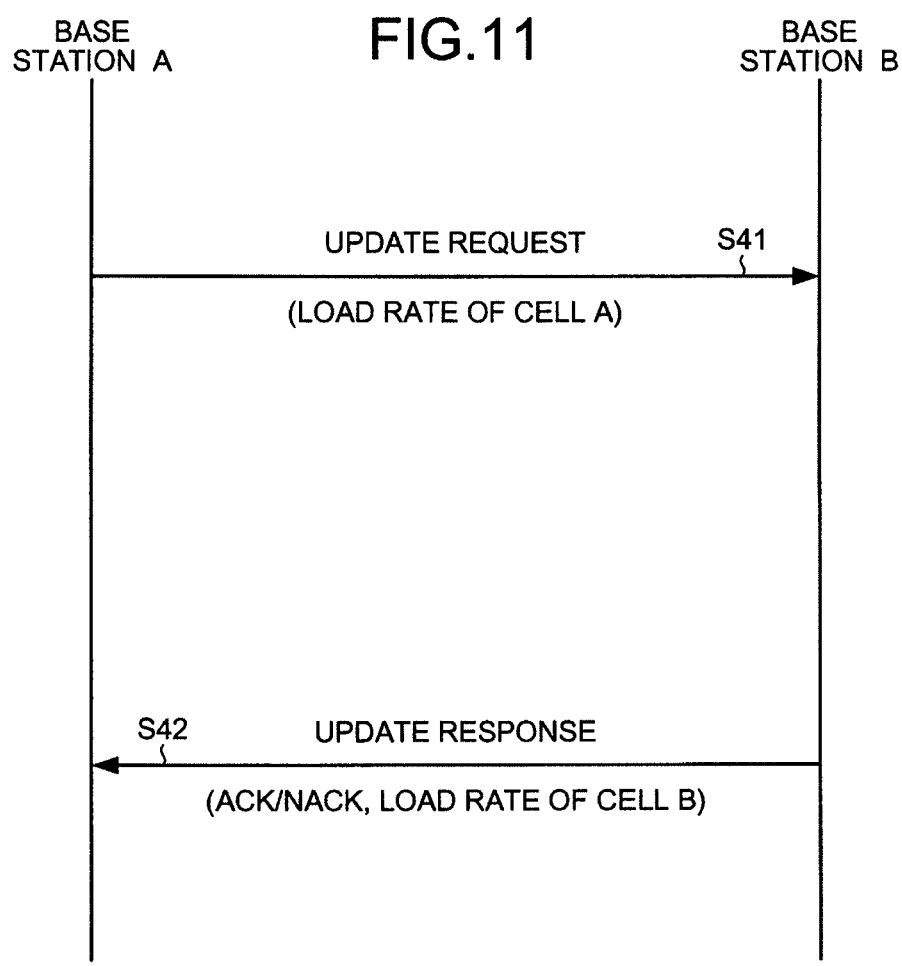

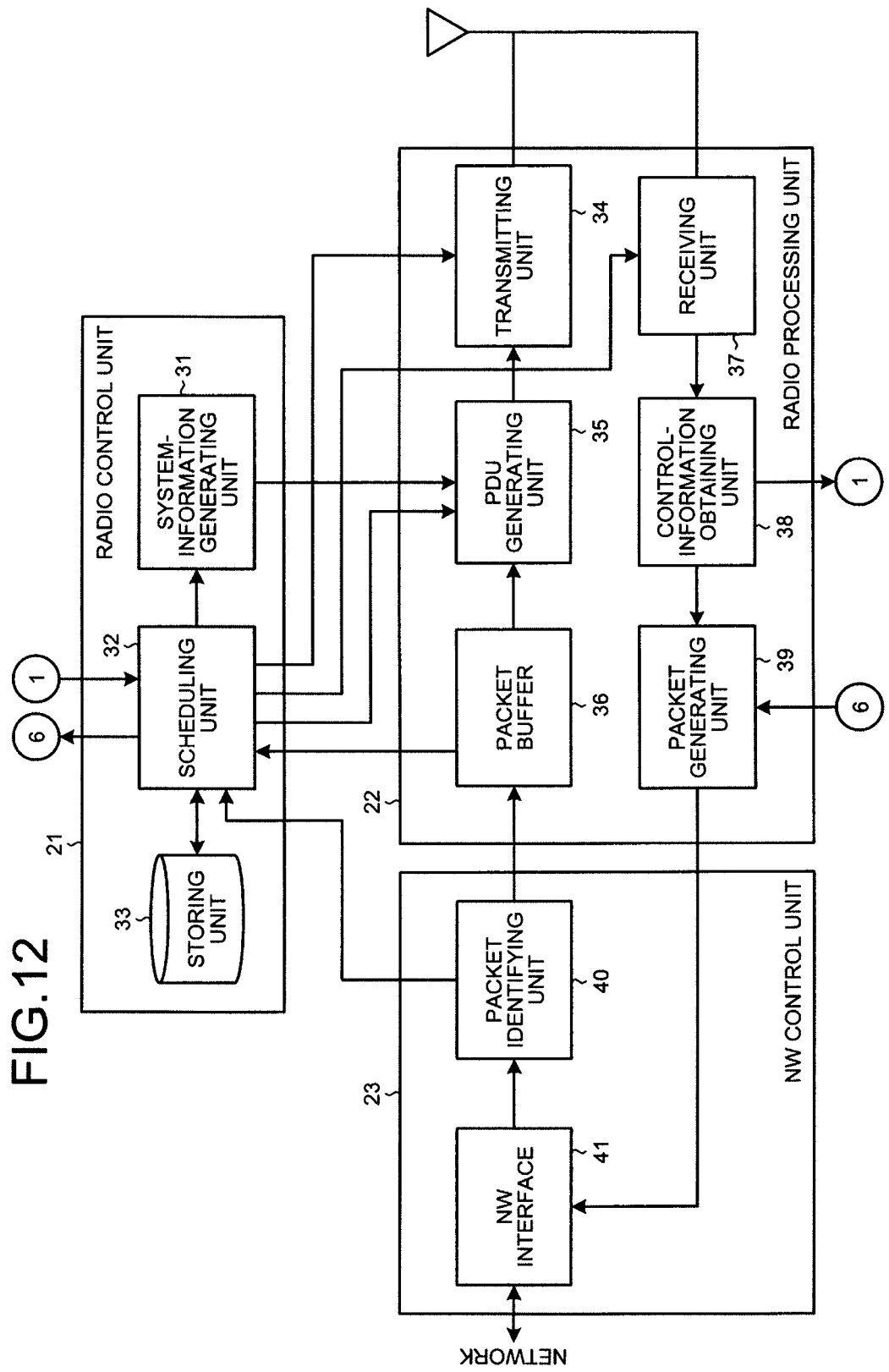

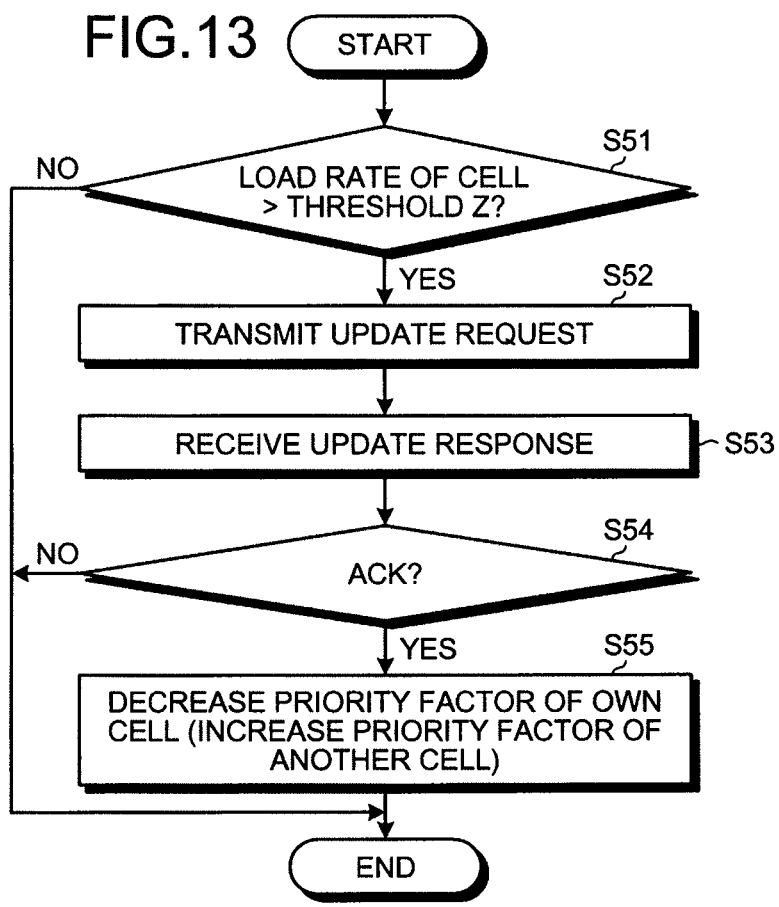

CELL SELECTION BASED ON PRIORITY FACTORS IN OVERLAPPING CELLS USING DIFFERENT FREQUENCIES

CROSS REFERENCE TO RELATED APPLICATIONS

This application is a continuation application of International Application PCT/JP2010/059002 filed on May 27, 2010 and designating the U.S., the entire contents of which are incorporated herein by reference.

FIELD

The embodiments discussed herein are related to a wireless communication system, a base station, a terminal, and a wireless communication method.

BACKGROUND

A terminal in a conventional wireless communication system has a communication mode and a stand-by mode. In the communication mode, the terminal is connected to a base station and communicates with a network. In the stand-by mode, the terminal is not connected to the base station, but monitors neighboring cells regularly and sets one of the cells that can be recognized as a serving cell. When starting a call or receiving a call from the network, the terminal connects to the base station that forms the serving cell, and starts communication. Here, a service area for wireless communication formed by the base station is called cell.

The terminal selects a cell that becomes the serving cell next based on cell selection information included in system information broadcast from the serving cell, the reception power of the serving cell, and the reception power of the neighboring cell(s). The cell selection information includes serving cell information (ServingCellInfo), inter-frequency information (InterFreqCarrierFreqInfo), and neighboring cell information (InterFreqNeighCellInfo). The serving cell information includes parameters such as the "hysteresis for giving priority to the serving cell" (q-Hyst), the "parameter for determining the priority among frequencies" (cellReselectionPriority), and the "threshold of the reception power of the frequency of the serving cell" (threshServingLow).

The inter-frequency information includes parameters such as the "threshold that is of the reception power of a given frequency and referred to when the priority is high" (threshX-High), the "threshold that is of the reception power of the given frequency and referred to when the priority is low" (threshX-Low), the "parameter for determining the priority among frequencies" (cellReselectionPriority), and the "offset of the reception power set for a given frequency" (q-OffsetFreq). The neighboring cell information includes parameters such as the "ID of a neighboring cell" (cell ID) and the "offset of the reception power set for a given neighboring cell" (q-OffsetCell).

The terminal in the stand-by mode sets the next serving cell according to the following (1) to (3).

(1) If the "cellReselectionPriority" in the serving cell information is less than the "cellReselectionPriority" in the inter-frequency information, the terminal in the stand-by mode measures the reception power of a neighboring cell of a different frequency included in the neighboring cell information. If the reception power exceeds the "threshX-High" in the inter-frequency information, the terminal can recognize the neighboring cell that uses a frequency having a high priority. In this case, the terminal sets the neighboring cell as a new serving cell.

(2) If the "cellReselectionPriority" in the serving cell information is equal to the "cellReselectionPriority" in the inter-frequency information, the terminal in the stand-by mode measures the reception power of the current serving cell (S_serv) and the reception power of a neighboring cell of a different frequency (S_neigh) included in the neighboring cell information. If S_neigh satisfies the equation below, it means that S_neigh is higher than S_serv by the offset. In this case, the terminal sets the neighboring cell as a new serving cell.

$$[S\_serv]+[q\text{-}Hyst]<[S\_neigh]-([q\text{-}OffsetFreq]+[q\text{-}OffsetCell])$$

(3) If the "cellReselectionPriority" in the serving cell information is greater than the "cellReselectionPriority" in the inter-frequency information, the terminal in the stand-by mode measures S_serv and S_neigh. If S_serv is less than the "threshServingLow," the terminal determines that the current serving cell is unconnectable. On the other hand, if S_neigh exceeds the "threshX-Low" in inter-frequency information, the terminal determines that the neighboring cell is connectable. In this case, the terminal sets the neighboring cell as a new serving cell.

To summarize (1) to (3) described above, if the terminal in the stand-by mode can recognize multiple cells of different frequencies, the terminal preferentially sets a cell using a frequency of a high priority as the serving cell. If the cells have the same priority, the terminal preferentially sets a cell having a high reception power as the serving cell.

On the other hand, it has been suggested to connect a terminal to a base station as follows: the terminal divides connectable base stations into two groups, namely, a group includes base stations having the high reception power and the other group includes base stations having the low reception power, requests a connection to a base station selected from one of the groups, and if the base station is unconnectable, requests a connection to a base station selected from the other group, and repeats the above operation until the terminal succeeds to connect to a base station. Concerning such conventional communication systems and methods, refer to Japanese Laid-Open Patent Publication No. H11-285046 and 3GPP TS 36.304 V9.1.0 (2009-12).

However, according to the conventional method of setting the serving cell, the terminal in the stand-by mode preferentially sets a cell using a frequency of a high priority as the serving cell, and if the priority is the same, a cell having a high reception power. Generally, the reception power at the terminal in the stand-by mode is greater in a cell that uses a lower frequency band if the transmission power of the base stations is the same. Thus, if multiple terminals in the stand-by mode are located in the same area where multiple cells of different frequencies can be recognized, the terminals are likely to set the same cell as the serving cell. This holds true whether or not the cells are formed by the same base station or by multiple base stations, respectively. This results in an increased load of the cell set as the serving cell in processing connections from the terminals.

SUMMARY

According to an aspect of an embodiment, a wireless communication system includes: at least one base station that forms a plurality of cells of different frequencies such that the cells partially or completely overlap with each other; and a terminal that is capable of recognizing the cells of the different frequencies. The base station determines priority factors of the different frequencies of the cells, and transmits the priority factors to the terminal that has set a cell formed by the base station as a serving cell. The terminal receives the priority factors from the base station forming the cell set as the serving cell, and selects a cell to be set as the serving cell next from among the cells based on the priority factors.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a flowchart of a determination process of a priority factor in a wireless communication method according to the second embodiment;

FIG. 7 is a block diagram of a terminal according to the second embodiment;

FIG. 8 is a flowchart of a selection process of the serving cell in the wireless communication method according to the second embodiment;

FIG. 9 is a continuation of the flowchart of FIG. 8;

FIG. 10 is a continuation of the flowchart of FIG. 9;

FIG. 11 is a sequence diagram of an update process of the cell selection information in a wireless communication method according to a third embodiment;

FIG. 12 is a block diagram of a base station according to the third embodiment;

FIG. 13 is a flowchart of a transmission process of an update request in the wireless communication method according to the third embodiment.

DESCRIPTION OF EMBODIMENTS

Embodiments of a wireless communication system, a base station, a terminal, and a wireless communication method according to the present invention are described in detail below with reference to the drawings. In the embodiments, a base station determines a priority factor of a frequency of each cell based on the load of multiple cells of different frequencies, and the terminal selects a cell to be set as the serving cell next from among the cells based on the priority factor. However, the present invention is not limited to the embodiments.

Figure 1:
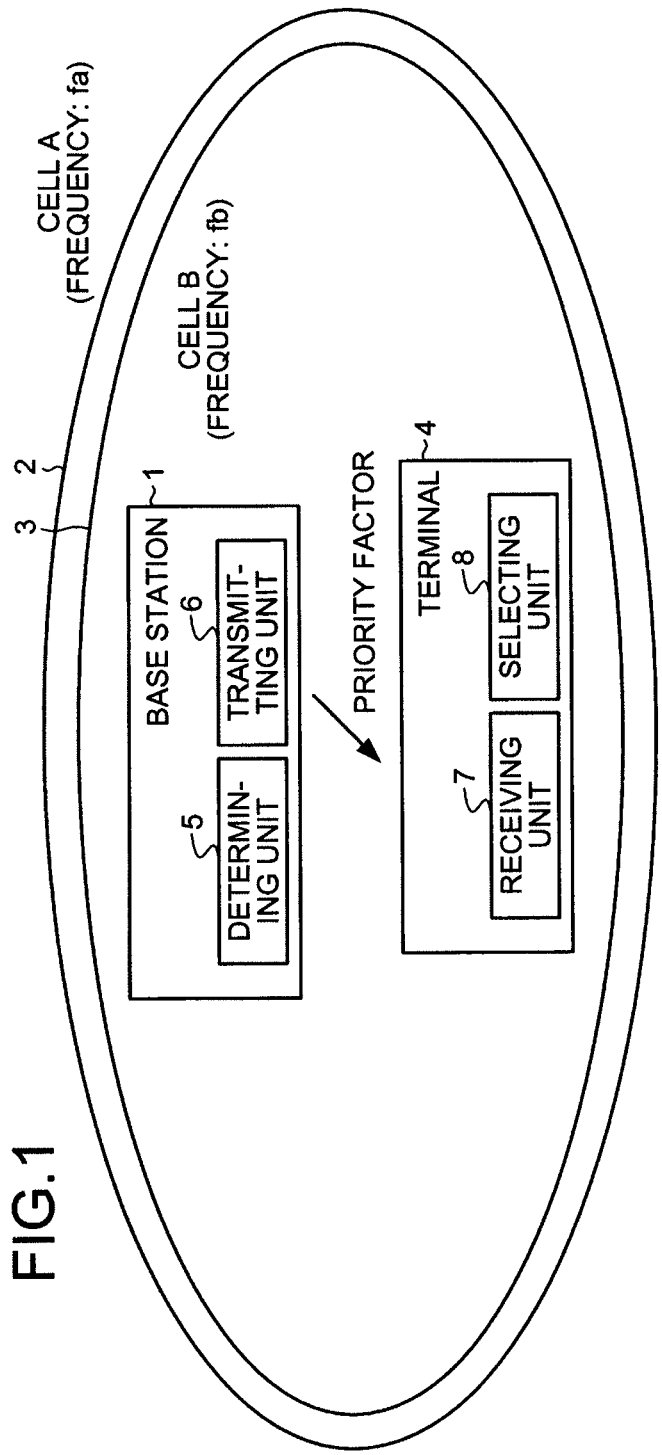
FIG. 1 is a block diagram of a wireless communication system according to a first embodiment.

FIG. 1 is a block diagram of a wireless communication system according to a first embodiment. As depicted in FIG. 1, the wireless communication system includes a base station 1 that forms multiple cells of different frequencies, for example, a cell A2 of a frequency fa and a cell B3 of a frequency fb. The cells A2 and B3 partially or completely overlap with each other. A terminal 4 can recognize the cells A2 and B3 when being located in the overlapping area of the cells A2 and B3. The terminal 4 in the stand-by mode sets one of the cells that can be recognized as the serving cell.

The base station 1 includes a determining unit 5 and a transmitting unit 6. The determining unit 5 determines, based on the load of the cells A2 and B3, a priority factor of the frequency fa of the cell A2 and a priority factor of the frequency fb of the cell B3. The transmitting unit 6 transmits the determined priority factors to the terminal 4 that has set a cell formed by the base station 1 (i.e., the cell A2 or B3) as the serving cell.

The terminal 4 includes a receiving unit 7 and a selecting unit 8. When the terminal 4 is in the stand-by mode, the receiving unit 7 receives the priority factors from the base station 1 forming the serving cell (i.e., the cell A2 or B3), and the selecting unit 8 selects a cell to be set as the serving cell next from among the cells A2 and B3 based on the received priority factors.

Figure 2:
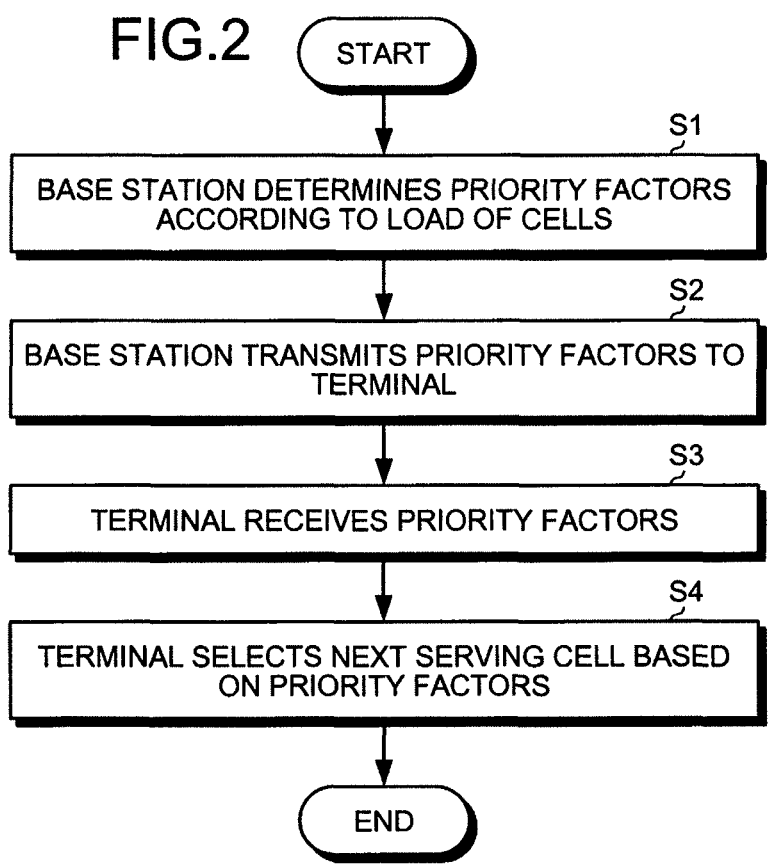
FIG. 2 is a flowchart of a wireless communication method according to the first embodiment.

FIG. 2 is a flowchart of a wireless communication method according to the first embodiment. As depicted in FIG. 2, the determining unit 5 of the base station 1 determines the priority factor of the frequency fa of the cell A2 and the priority factor of the frequency fb of the cell B3 according to the load of the cells A2 and B3 (step S1). The transmitting unit 6 of the base station 1 transmits the priority factors determined at step S1 to the terminal 4 that has set a cell formed by the base station 1 (i.e., the cell A2 or B3) as the serving cell (step S2).

The receiving unit 7 of the terminal 4 in the stand-by mode receives the priority factors from the base station 1 forming the serving cell (i.e., the cell A2 or B3) (step S3). Based on the priority factors received at step S3, the selecting unit 8 of the terminal 4 selects a cell to be set as the serving cell next from among the cells A2 and B3 (step S4), thereby ending the sequence of processes.

According to the first embodiment, when the terminal 4 is in the stand-by mode, the terminal 4 sets the cell A2 or B3 as the next serving cell based on the priority factor of the frequency fa of the cell A2 and the priority factor of the frequency fb of the cell B3. The priority factors have been determined according to the load of the cells A2 and B3. Thus, the terminal 4 sets the cell A2 or B3 as the next serving cell according to the load of the cells A2 and B3, thereby preventing a given cell from being set as the serving cell by multiple terminals in the stand-by mode, and preventing an increase of the load of the cell set as the serving cell.

Alternatively, the load of the cell can be distributed by forcing terminals connected to the same cell to connect to another cell by handover. However, this results in an increased process for handover and a consumption of radio resource for the process. In contrast, according to the first embodiment, the cell A2 or B3 is preliminary set as the next serving cell according to the load of the cells A2 and B3. Thus, it is not necessary to force the terminals to connect to different cells by handover, thereby preventing increased processing and consumption of radio resource at the base station and the terminal due to the handover.

Figure 3:
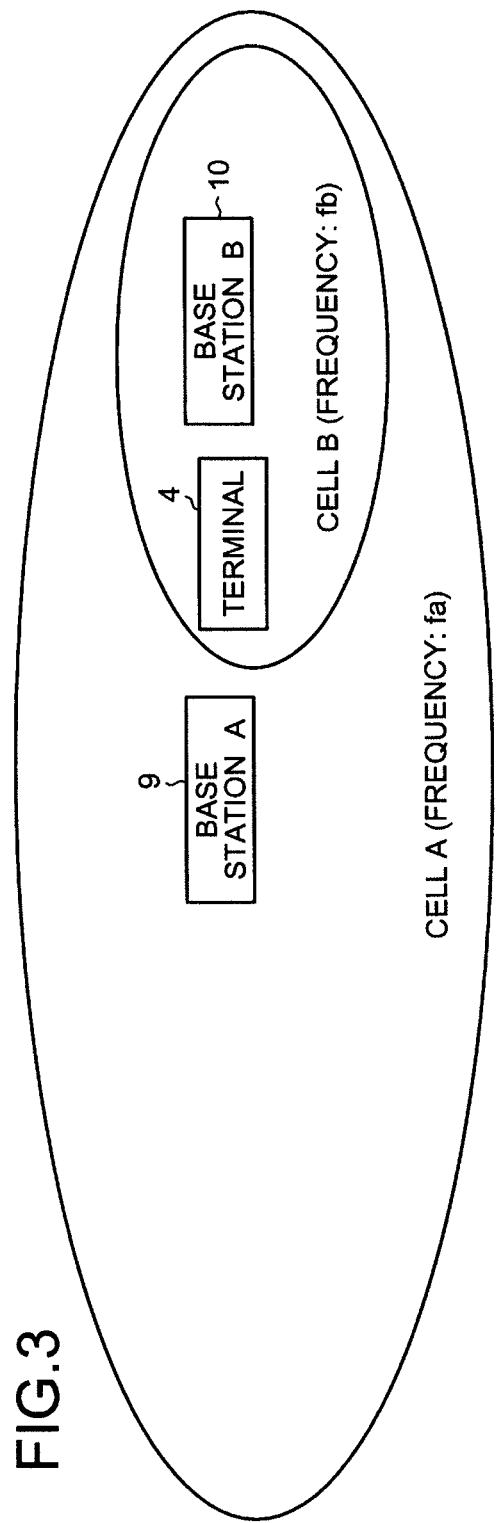
FIG. 3 is a block diagram of one example of the wireless communication system according to the first embodiment.
Figure 4:
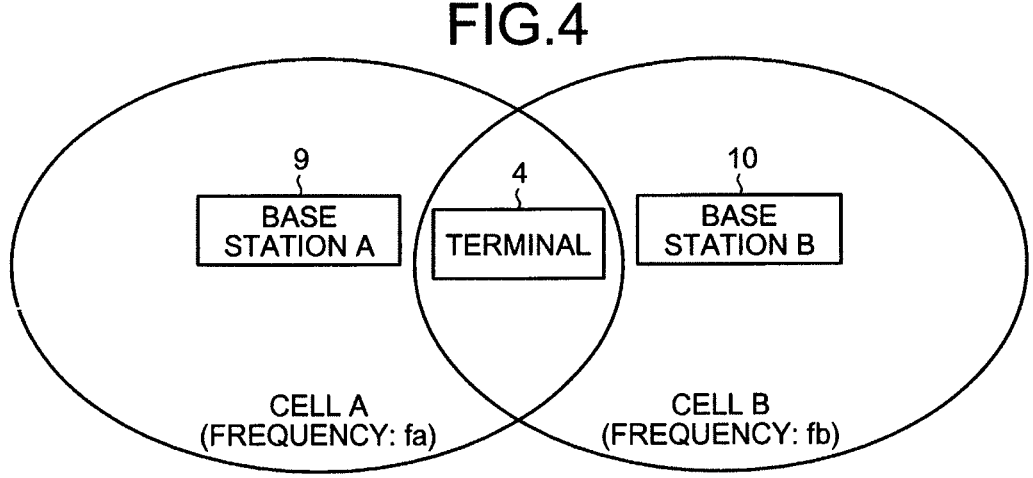
FIG. 4 is a block diagram of another example of the wireless communication system according to the first embodiment.

Similar advantages can be achieved when, as depicted in FIG. 3 or 4, multiple base stations such as a base station A9 and a base station B10 form multiple cells of different frequencies, respectively, such that the cells partially or completely overlap with each other, and the terminal 4 is located in the overlapping area. The number of the cells of different frequencies is not limited to two, and may be more than two.

An example of the wireless communication system according to the first embodiment is the long-term evolution (LTE)

that is under standardization by the 3rd generation partnership project (3GPP) that is an organization for standardization of the 3rd generation mobile communications technology. In a second embodiment, the wireless communication system according to the first embodiment is applied to the LTE, and it is assumed that one base station forms multiple cells of different frequencies as depicted in FIG. 1. Description redundant with the first embodiment is omitted. The wireless communication system according to the first embodiment is applicable to a wireless communication system other than the LTE.

Figure 5:
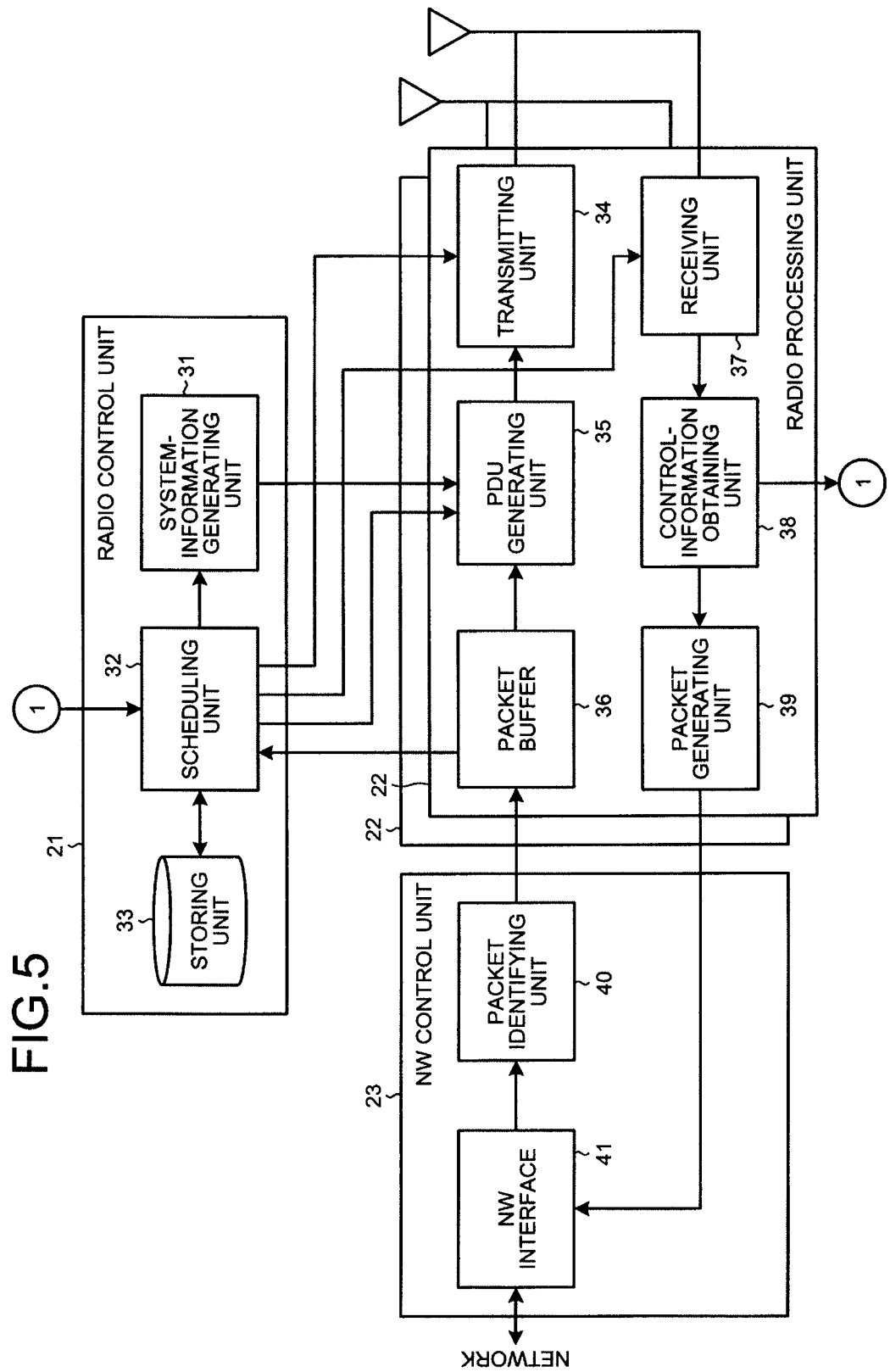
FIG. 5 is a block diagram of a base station according to a second embodiment.

FIG. 5 is a block diagram of a base station according to the second embodiment. As depicted in FIG. 5, the base station includes a radio control unit 21, a radio processing unit 22, and a network (NW) control unit 23. The radio processing unit 22 is provided for each of the cells of different frequencies formed by the base station. Here, it is assumed that the base station forms two cells of different frequencies (for example, the cells A and B). Thus, two radio processing units 22 are depicted in FIG. 5.

The radio control unit 21 controls the radio processing unit 22 for each cell according to the number of terminals connected to the base station and/or the load of traffic, etc. The radio control unit 21 includes a system-information generating unit 31, a scheduling unit 32 as a determining unit, and a storing unit 33.

The scheduling unit 32 schedules processes for wireless communication based on the amount of packets stored in a packet buffer 36 of the radio processing unit 22, and data for wireless communication and control information that are received from the terminal, etc. The scheduling unit 32 sets values of the parameters of the cell selection information of each cell formed by the base station. As described in the "BACKGROUND" section, the cell selection information includes the serving cell information, the inter-frequency information, and the neighboring cell information.

In the second embodiment, the serving cell information includes a parameter of "priority factor" (PriorityFactor). The inter-frequency information includes a parameter of "priority factor" (PriorityFactor), and a parameter of "condition regarding reception power" (TriggerThresh) used as a standard for the terminal whether to select a cell to be set as the serving cell next based on the priority factors. The scheduling unit 32 instructs the system-information generating unit 31 to generate the cell selection information of each cell.

The system-information generating unit 31 generates the system information that includes the cell selection information based on the values of the parameters of the cell selection information set by the scheduling unit 32. The generated system information is transmitted to the protocol data unit (PDU) generating unit 35 of the radio processing unit 22 corresponding to the cell. The storing unit 33 stores the system information set at the point in time.

The radio processing unit 22 performs a transmission process of data to a terminal connected to the base station and a terminal in the stand-by mode whose serving cell is formed by the base station, and a reception process of data from the terminals. The radio processing unit 22 includes a transmitting unit 34, the PDU generating unit 35, the packet buffer 36, a receiving unit 37, a control-information obtaining unit 38, and a packet generating unit 39.

The packet buffer 36 stores packets transmitted from a packet identifying unit 40 of the NW control unit 23. The PDU generating unit 35 generates, based on the result of scheduling performed by the scheduling unit 32, data units according to the protocol using the packets stored in the packet buffer 36 and the system information generated by the system-information generating unit 31. The transmitting unit 34 transmits via an antenna, based on the result of the scheduling, the data generated by the PDU generating unit 35 to the terminal connected to the base station and the terminal in the stand-by mode whose serving cell is formed by the base station. Each radio processing unit 22 broadcasts the system information regularly using the frequency used in the corresponding cell.

The receiving unit 37 receives data via the antenna from the terminal connected to the base station and the terminal in the stand-by mode whose serving cell is formed by the base station. The control-information obtaining unit 38 obtains control information from the data received from the terminal. The obtained control information is transmitted to the scheduling unit 32. User data addressed to the network are transmitted to the packet generating unit 39 that generates packets using the data transmitted from the control-information obtaining unit 38.

The NW control unit 23 processes packets received from the network and the radio processing unit 22, and includes the packet identifying unit 40 and a network (NW) interface 41.

The NW interface 41 is an interface with the network, and receives packets of user data from the network side. The NW interface 41 transmits packets addressed to the network and generated by the packet generating unit 39 to the network. The packet identifying unit 40 identifies the type of the packets of the user data received from the network side (for example, audio data, data communication, etc.) and the destination of the packets. After the identification by the packet identifying unit 40, the packets are transmitted to the radio processing unit 22 for the cell corresponding to the destination, and stored in the packet buffer 36 of the radio processing unit 22 according to the type of the packets, for example.

The wireless communication method according to the second embodiment is similar to that according to the first embodiment.

FIG. 6 is a flowchart of a determination process of the priority factor in the wireless communication method according to the second embodiment. The determination process is executed at a step corresponding to step S1 (see FIG. 2) of the wireless communication method according to the first embodiment. As depicted in FIG. 6, when the determination process is started at the base station, the scheduling unit 32 obtains the load of each cell formed by the base station, that is, the load of the cells A and B. The number of terminals using the cell, the state of usage of the radio resource of the cell, etc., can be used as the load of the cell. The scheduling unit 32 calculates the difference between the load rates of the cells A and B, and determines whether the difference is greater than a threshold X (step S11).

For example, the load rate may be a ratio of the number of terminals currently using the cell to the maximum number of terminals that can use the cell, or a ratio of the radio resource currently used to the maximum radio resource of the cell. The threshold X may be preliminary set and stored in the storing unit 33.

If the difference between the load rates of the cells A and B is not greater than the threshold X (step S11: NO), the scheduling unit 32 determines not to update the cell selection information, thereby ending the process. If the difference is greater than the threshold X (step S11: YES), the scheduling unit 32 determines to update the cell selection information, and compares the load rates of the cells A and B (step S12).

If the load rate of the cell A is greater than the load rate of the cell B (step S12: YES), the scheduling unit 32 decreases the "priority factor" in the serving cell information of the cell selection information of the cell A, or increases the "priority factor" in the serving cell information of the cell selection information of the cell B. Alternatively, the "priority factor" may be decreased with respect to the cell A and increased with respect to the cell B (step S13), thereby increasing the number of terminals that are in the stand-by mode and set the cell B as the serving cell, and reducing the load of the cell A. Thus, the sequence of processes ends.

If the load rate of the cell A is not greater than the load rate of the cell B (step S12: NO), the scheduling unit 32 decreases the "priority factor" in the serving cell information of the cell selection information of the cell B, or increases the "priority factor" in the serving cell information of the cell selection information of the cell A. Alternatively, the "priority factor" may be decreased with respect to the cell B and increased with respect to the cell A (step S14), thereby increasing the number of terminals that are in the stand-by mode and set the cell A as the serving cell, and reducing the load of the cell B. Thus, the sequence of processes ends.

For example, the initial value of the "priority factor" in the serving cell information of the cell selection information may be 1, and if the load becomes unbalanced, the "priority factor" may be decreased by 0.1 with respect to a cell having a large load rate, or increased by 0.1 with respect to a cell having a small load rate. For example, if the load rate of the cell B is greater than the load rate of the cell A, the "priority factor" in the serving cell information of the cell selection information of the cell A may be set to 1.1, and the "priority factor" in the serving cell information of the cell selection information of the cell B may be set to 1.

Alternatively, the former "priority factor" may be set to 1, and the latter "priority factor" may be set to 0.9. Alternatively, the former "priority factor" may be set to 1.1, and the latter "priority factor" may be set to 0.9.

FIG. 7 is a block diagram of the terminal according to the second embodiment. The terminal includes a duplexer 51, a receiving unit 52, a scheduling unit 53 as a selecting unit, and a control-information extracting unit 54.

The receiving unit 52 receives data transmitted from the base station via an antenna and the duplexer 51. The receiving unit 52 measures the reception power of the serving cell and the reception power of the neighboring cell(s), and notifies the scheduling unit 53 of the result of the measurement. The control-information extracting unit 54 extracts system information from the data received by the receiving unit 52. The extracted system information is notified to the scheduling unit 53 that performs a selection process of the serving cell and sets the next serving cell based on the reception power of the serving cell and the reception power of the neighboring cell(s) that are notified from the receiving unit 52, and the cell selection information in the system information notified from the control-information extracting unit 54.

The terminal includes a control-information generating unit 55, a PDU generating unit 56, a transmitting unit 57, a storing unit 58, a packet buffer 59, a packet generating unit 60, and an application processing unit 61.

The packet buffer 59 stores packets processed by the application processing unit 61. The packet generating unit 60 generates packets using the data transmitted from the control-information extracting unit 54. The application processing unit 61 processes packets transmitted from the packet generating unit 60.

The terminal in the stand-by mode uses the frequency of the serving cell when connecting to the base station. The scheduling unit 53 schedules processes for wireless communication based on the amount of packets stored in the packet buffer 59, data for wireless communication and control information that are received from the base station, etc. The scheduling unit 53 instructs the control-information generating unit 55 to generate control information.

The control-information generating unit 55 generates control information for the terminal to connect to the base station. The generated control information is transmitted to the PDU generating unit 56 that generates, based on the result of the scheduling performed by the scheduling unit 53, data units according to the protocol using the packets stored in the packet buffer 59 and the control information generated by the control-information generating unit 55. The transmitting unit 57 transmits, based on the result of the scheduling, the data generated by the PDU generating unit 56 to the base station via the duplexer 51 and the antenna.

FIGS. 8 to 10 are flowcharts of the selection process of the serving cell in the wireless communication method according to the second embodiment. The selection process is executed at a step corresponding to step S4 (see FIG. 2) in the wireless communication method according to the first embodiment. As depicted in FIG. 8, when the selection process is started at the terminal, the scheduling unit 53 determines whether the "cellReselectionPriority" in the serving cell information of the cell selection information is equal to the "cellReselectionPriority" in the inter-frequency information of the cell selection information (step S21).

If so (step S21: YES), the scheduling unit 53 determines whether the reception power of a given neighboring cell is greater than the "condition regarding reception power" in the inter-frequency information (step S22). If so (step S22: YES), the scheduling unit 53 generates an arbitrary value W selected from 0 to 1 (step S23).

The scheduling unit 53 calculates a value Y obtained by dividing the "priority factor" in the serving cell information by the sum of the "priority factors" (step S24). The sum of the "priority factors" is the sum of the "priority factor" (PriorityFactor) in the serving cell information and the "priority factor" (PriorityFactor) in the inter-frequency information. The scheduling unit 53 determines whether the value W generated at step S23 is less than the value Y calculated at step S24 (step S25).

If so (step S25: YES), the scheduling unit 53 selects the current serving cell as the next serving cell (step S26). If W is not less than Y (step S25: NO), the scheduling unit 53 selects the given neighboring cell (not the current serving cell) as the next serving cell (step S27), thereby ending the sequence of processes.

On the other hand, if the "cellReselectionPriority" in the serving cell information is not equal to the "cellReselectionPriority" in the inter-frequency information (step S21: NO), the scheduling unit 53 compares them as depicted in FIG. 9 (step S28). If the "cellReselectionPriority" in the serving cell information is greater (step S28: PRIORITY IN SERVING CELL INFORMATION IS GREATER), the scheduling unit 53 determines whether the reception power of the serving cell is less than the "threshServingLow" in the serving cell information (step S29).

If so (step S29: YES), the scheduling unit 53 determines if the reception power of the given neighboring cell is greater than or equal to the "threshX-Low" in the inter-frequency information (step S30). If the reception power is greater than or equal to the "threshX-Low" (step S30: YES), the scheduling unit 53 selects the given neighboring cell as the next serving cell (FIG. 8, step S27).

If the reception power of the serving cell is not less than the "threshServingLow" (step S29: NO), or if the reception power of the given neighboring cell is not greater than or equal to the "threshX-Low" (step S30: NO), the scheduling unit 53 selects the current serving cell as the next serving cell (FIG. 8, step S26), thereby ending the sequence of processes.

If the "cellReselectionPriority" in the inter-frequency information is greater (step S28: PRIORITY IN INTER-FREQUENCY INFORMATION IS GREATER), the scheduling unit 53 determines if the reception power of the given neighboring cell is greater than or equal to the "threshX-High" in the inter-frequency information as depicted in FIG. 10 (step S31). If the reception power is greater than or equal to the "threshX-High" (step S31: YES), the scheduling unit 53 selects the given neighboring cell as the next serving cell (FIG. 8, step S27).

If the reception power of the given neighboring cell is not greater than or equal to the "threshX-High" (step S31: NO), the scheduling unit 53 selects the current serving cell as the next serving cell (FIG. 8, step S26), thereby ending the sequence of processes. If the reception power of the given neighboring cell is not greater than the "condition regarding reception power" (step S22: NO), the scheduling unit 53 selects the current serving cell as the next serving cell (FIG. 8, step S26), thereby ending the sequence of processes.

According to the second embodiment, advantages being similar to those of the first embodiment can be achieved.

In a third embodiment, the wireless communication system according to the first embodiment is applied to the LTE. In the third embodiment, it is assumed that multiple base stations form multiple cells of different frequencies as depicted in FIG. 3. Here, an example is described where two base stations form two cells of different frequencies, respectively. Description redundant with the first embodiment is omitted. Components similar to those of the second embodiment are assigned the same signs, and description thereof is omitted.

FIG. 11 is a sequence diagram of an update process of the cell selection information in the wireless communication method according to the third embodiment. As depicted in FIG. 11, one base station A transmits a cell-selection-information update request (hereinafter, "update request") to the other base station B (step S41). The load rate of the cell from which the update request has been transmitted is inserted into the update request. The base station B receives the update request, and returns as a response thereto, a cell-selection-information update response (hereinafter, "update response") ACK or NACK to the base station A (step S42). The load rate of the cell from which the update response has been transmitted is inserted into the update response.

Thus, the base stations A and B recognize the load rate of one another. If the base station B returns the update response ACK to the base station A, the cell selection information at the base stations A and B is updated. In the example of FIG. 3, the cell A of the base station A completely includes the cell B of the base station B; alternatively, the cell B of the base station B may completely include the cell A of the base station A. Alternatively, the cell A of the base station A and the cell B of the base station B may partially overlap with each other as depicted in FIG. 4.

FIG. 12 is a block diagram of the base station according to the third embodiment. As depicted in FIG. 12, the configuration of the base stations A and B is the same as that of the second embodiment. However, the NW interface 41 exchanges the update request and the update response with a neighboring base station (i.e., the base station B for the NW interface 41 of the base station A). When receiving the update request from the NW interface 41, the packet identifying unit 40 notifies the scheduling unit 32 of the update request.

The scheduling unit 32 determines whether to update the cell selection information based on the load rate that is inserted into the update request and of the cell from which the update request has been transmitted. The scheduling unit 32 measures the load rate of the cell of the base station, and the cell selection information is to be updated, generates the update response ACK and inserts the load rate of the cell of the base station into the update response, and transmits the update response to the packet generating unit 39. At the same time, the scheduling unit 32 notifies the system-information generating unit 31 that the cell selection information is to be updated. If the cell selection information is not to be updated, the scheduling unit 32 generates the update response NACK and inserts the load rate of the cell of the base station into the update response, and transmits the update response to the packet generating unit 39.

The packet generating unit 39 generates a packet from the update response. The packet of the update response is transmitted to the base station that has transmitted the update request, via the NW interface 41 and the network.

The scheduling unit 32 measures the load rate of the cell of the base station, generates the update request, and transmits the update request into which the load rate is inserted, to the packet generating unit 39 that generates a packet from the update request. The packet of the update request is transmitted to the neighboring base station(s) via the NW interface 41 and the network.

The scheduling unit 32 receives, as a response to the update request that the base station has transmitted, the update response from the neighboring base station(s) via the network, the NW interface 41, and the packet identifying unit 40. If the update response is ACK, the scheduling unit 32 notifies the system-information generating unit 31 that the cell selection information is to be updated. Other components of the base station are the same as those of the second embodiment.

The wireless communication method according to the third embodiment is similar to that according to the first embodiment.

FIG. 13 is a flowchart of a transmission process of the update request in the wireless communication method according to the third embodiment. The transmission process is executed at a step corresponding to step S1 (see FIG. 2) of the wireless communication method according to the first embodiment. As depicted in FIG. 13, when the transmission process is started at the base station A, the scheduling unit 32 measures the load rate of the cell of the base station A, and determines whether the measured load rate is greater than a threshold Z (step S51). The threshold Z may be preliminary set and stored in the storing unit 33, for example.

If the load rate of the cell of the base station A is not greater than the threshold Z (step S51: NO), the scheduling unit 32 determines not to update the cell selection information, thereby ending the process. If the load rate is greater than the threshold Z (step S51: YES), the base station A transmits the update request to the neighboring base station B (step S52). The load rate of the cell of the base station A is included in the update request. The base station A receives the update response from the base station B as a response to the update request (step S53). The load rate of the cell of the base station B is included in the update response.

The scheduling unit 32 determines whether the received update response is ACK (step S54). If so (step S54: YES), the scheduling unit 32 decreases the "priority factor" in the serving cell information of the cell selection information, that is, decreases the priority factor of the cell of the base station A.

Alternatively, the "priority factor" in the inter-frequency information of the cell selection information, that is, the priority factor of the cell of the neighboring base station B may be increased. Alternatively, the "priority factor" in the serving cell information may be decreased and the "priority factor" in the inter-frequency information may be increased (step S55), thereby increasing the number of terminals that are in the stand-by mode and set the cell of the base station B as the serving cell, and reducing the load of the cell of the base station A. Thus, the sequence of processes ends. If the update response is not ACK, that is, the update response is NACK (step S54: NO), the scheduling unit 32 determines not to update the cell selection information, thereby ending the sequence of processes.

Figure 14:
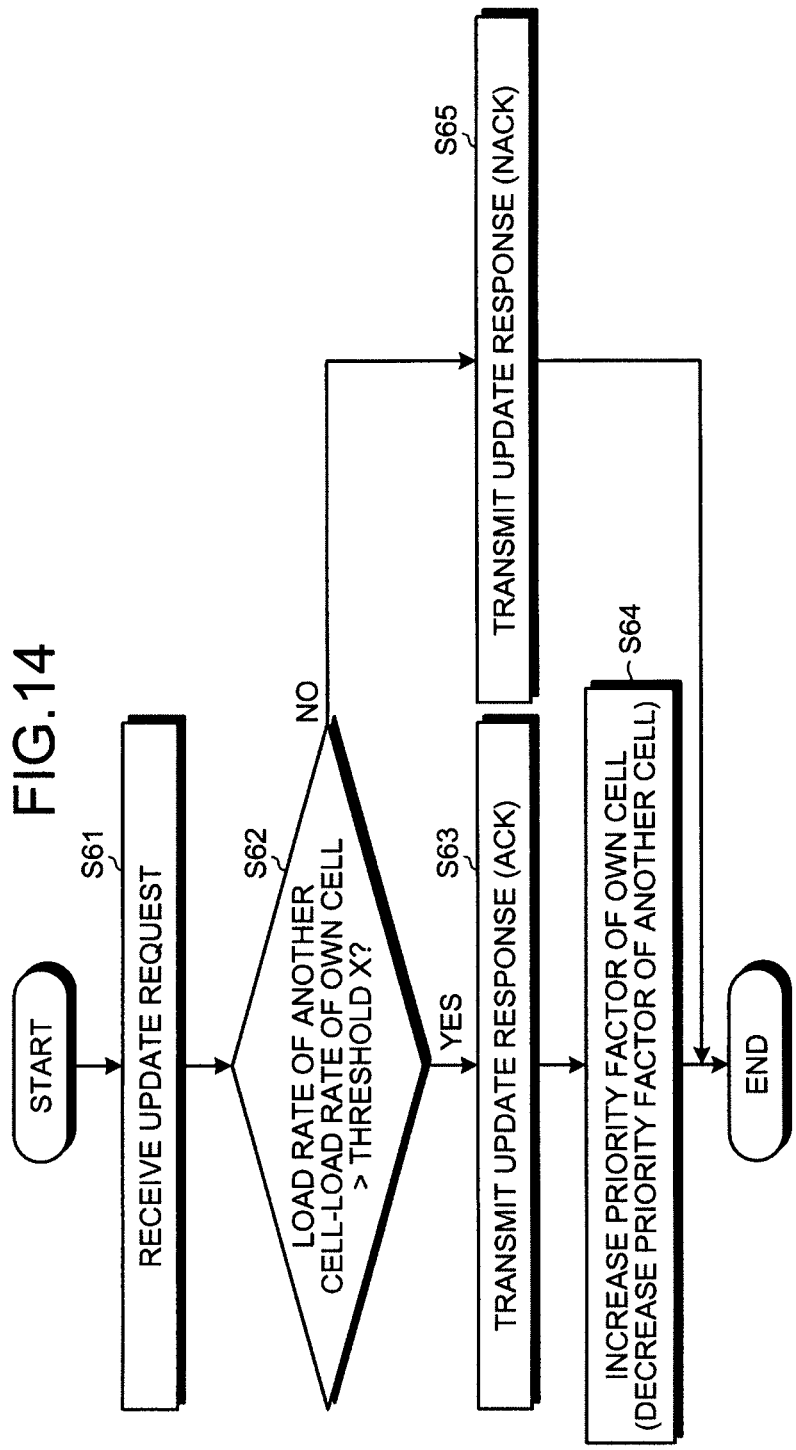
FIG. 14 is a flowchart of a reception process of the update request in the wireless communication method according to the third embodiment.

FIG. 14 is a flowchart of a reception process of the update request in the wireless communication method according to the third embodiment. The reception process is executed at a step corresponding to step S1 (see FIG. 2) in the wireless communication method according to the first embodiment. As depicted in FIG. 14, when the reception process is started at the base station B, the base station B receives the update request from the base station A (step S61). The load rate of the cell of the base station A is included in the update request.

The scheduling unit 32 measures the load rate of the cell of the base station B, and determines whether a value obtained by subtracting the load rate of the cell of the base station B from the load rate of the cell of the base station A is greater than the threshold X (step S62). Similar to the second embodiment, the threshold X may be preliminary set and stored in the storing unit 33, for example. If the value is greater than the threshold X (step S62: YES), the base station B transmits the update response ACK to the base station A that has transmitted the update request (step S63). The scheduling unit 32 increases the "priority factor" in the serving cell information of the cell selection information, that is, the priority factor of the cell of the base station B.

Alternatively, the "priority factor" in the inter-frequency information of the cell selection information, that is, the priority factor of the cell of the base station A may be decreased. Alternatively, the "priority factor" in the serving cell information may be increased and the "priority factor" in the inter-frequency information may be decreased (step S64), thereby increasing the number of terminals that are in the stand-by mode and set the cell of the base station B as the serving cell, and reducing the load of the cell of the base station A. Thus, the sequence of processes ends.

On the other hand, if the value obtained by subtracting the load rate of the cell of the base station B from the load rate of the cell of the base station A is not greater than the threshold X (step S62: NO), the base station B transmits the update response NACK to the base station A that has transmitted the update request (step S65), thereby ending the sequence of processes. The load rate of the cell of the base station B is included in the update response.

If the cell selection information is to be updated, the amount by which the "priority factor" is increased/decreased may be set as the same for the base stations that exchanges the update request. For example, the amount by which the "priority factor" is changed may be preliminary determined at the base stations. For example, if the base station A that has transmitted the update request increases (or decreases) the "priority factor" in the serving cell information (or the inter-frequency information) of the cell selection information by 0.1, the base station B that has received the update request increases (or decreases) the "priority factor" in the serving cell information (or the inter-frequency information) of the cell selection information by 0.1.

Alternatively, the amount by which the "priority factor" is changed may be determined based on the load rate a of the cell of the base station A that has transmitted the update request and the load rate b of the cell of the base station B that has received the update request. The "priority factor" in the serving cell information of the cell selection information of the base station A and the "priority factor" in the inter-frequency information of the cell selection information of the base station B are updated to the values represented by the following equation.

[Updated priority factor]=[Current priority factor]×(a+b)/(2×a)

The "priority factor" in the inter-frequency information of the cell selection information of the base station A and the "priority factor" in the serving cell information of the cell selection information of the base station B are updated to the values represented by the following equation.

[Updated priority factor]=[Current priority factor]×(a+b)/(2×b)

Configuration of the terminal is similar to that of the second embodiment. The selection process of the serving cell performed by the terminal is similar to that of the second embodiment.

According to the third embodiment, advantages being similar to those of the first embodiment can be achieved.

According to the wireless communication system, the base station, the terminal, and the wireless communication method, an increase of the load of the cell set as the serving cell can be prevented when multiple terminals in the stand-by mode can recognize multiple cells of different frequencies.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system comprising:
    at least one base station that forms a plurality of cells of different frequencies such that the cells partially or completely overlap with each other; and
    a terminal that is configured to recognize the cells of different frequencies, wherein
    the base station determines priority factors of the different frequencies of the plurality of cells, and transmits the priority factors to the terminal that has set a cell of the plurality of cells formed by the base station as a serving cell,
    the terminal receives the priority factors from the base station forming the serving cell, and selects a cell to be set as the serving cell next from among the plurality of cells of different frequencies based on the priority factors; and
    wherein the terminal:
    receives, from the base station forming the cell set as the serving cell, a condition regarding reception power used as a standard for determining whether to select the cell to be set as the serving cell next;
    measures the reception power of a neighboring cell other than the serving cell;
    generates an arbitrary value when the measured value of the reception power satisfies the condition regarding reception power;

calculates a ratio based on a priority factor of a frequency of a recognizable cell and a priority factor of a frequency of the serving cell; and selects the cell to be set as the serving cell next from among the plurality of cells of the different frequencies based on a result of comparison between the ratio and the arbitrary value.

2. The wireless communication system according to claim 1, wherein the base station decreases a priority factor of a frequency of a cell having a relatively high load from a current value and/or increases a priority factor of a frequency of a cell having a relatively low load from a current value, according to load of the plurality of cells of different frequencies.

3. The wireless communication system according to claim 1, wherein the base station sets a condition regarding reception power used as a standard for the terminal to determine whether to select the cell to be set as the serving cell next based on the priority factors, and transmits the condition regarding reception power to the terminal that has set the cell formed by the base station as the serving cell.

4. A base station comprising:
a determining unit that determines priority factors of frequencies of a plurality of cells of different frequencies; and
a transmitting unit that transmits the priority factors to a terminal that has set a cell of the plurality of cells formed by the base station as a serving cell;
wherein the terminal:
receives, from the base station forming the cell set as the serving cell, a condition regarding reception power used as a standard for determining whether to select the cell to be set as the serving cell next;
measures the reception power of a neighboring cell other than the serving cell;
generates an arbitrary value when the measured value of the reception power satisfies the condition regarding reception power;
calculates a ratio based on a priority factor of a frequency of a recognizable cell and a priority factor of a frequency of the serving cell; and
selects the cell to be set as the serving cell next from among the plurality of cells of different frequencies based on a result of comparison between the ratio and the arbitrary value.

5. The base station according to claim 4, wherein the determining unit decreases a priority factor of a frequency of a cell having a relatively high load from a current value and/or increases a priority factor of a frequency of a cell having a relatively low load from a current value, according to load of the plurality of cells of different frequencies.

6. The base station according to claim 4, wherein the determining unit sets a condition regarding reception power used as a standard for the terminal to determine whether to select the cell to be set as the serving cell next based on the priority factors, and the transmitting unit transmits the condition regarding reception power to the terminal that has set the cell formed by the base station as the serving cell.

7. A terminal comprising:
a receiving unit that receives priority factors of frequencies of a plurality of cells of different frequencies, from a base station forming a cell set as a serving cell; and
a selecting unit that selects a cell to be set as a serving cell next from among the plurality of cells of the different frequencies based on the priority factors;
wherein
the receiving unit:
receives, from the base station forming the serving cell, a condition regarding reception power used as a standard for determining whether to select the cell to be set as the serving cell next; and
measures the reception power of a neighboring cell other than the serving cell; and
the selecting unit:
generates an arbitrary value when the measured value of the reception power satisfies the condition regarding reception power;
calculates a ratio based on a priority factor of a frequency of a recognizable cell of the plurality of cells and a priority factor of a frequency of the serving cell; and
selects the cell to be set as the serving cell next from among the plurality of cells of different frequencies based on a result of comparison between the ratio and the arbitrary value.

8. A wireless communication method comprising:
determining, by a base station, priority factors of frequencies of a plurality of cells of different frequencies;
transmitting, by the base station, the priority factors to a terminal that has set a cell of the plurality of cells of different frequencies formed by the base station as the serving cell;
receiving, by the terminal, the priority factors from the base station forming the cell set as the serving cell; selecting, by the terminal, a cell to be set as the serving cell next from among the plurality of cells based on the received priority factors;
measuring, by the terminal, the reception power of a neighboring cell other than the serving cell, wherein
the receiving includes receiving, as well as the priority factors, a condition regarding reception power used as a standard for determining whether to select the cell to be set as the serving cell next; and
the selecting includes:
generating an arbitrary value when the measured value of the reception power satisfies the condition regarding reception power; and
calculating a ratio based on a priority factor of a frequency of a recognizable cell and a priority factor of a frequency of the cell set as the serving cell; and
selecting the cell to be set as the serving cell next from among the plurality of cells of the different frequencies based on a result of comparison between the ratio and the arbitrary value.

9. The wireless communication method according to claim 8, wherein the determining includes decreasing, by the base station, a priority factor of a frequency of a cell having a relatively high load from a current value and/or increasing a priority factor of a frequency of a cell having a relatively low load from a current value, according to load of the plurality of cells of different frequencies.

* * * * *